United States Patent
Gardini Vedovatto

(10) Patent No.: US 12,039,471 B2
(45) Date of Patent: Jul. 16, 2024

(54) TRACKING ISSUES AND RESOLUTION OF SAME IN A WIRELESS COMMUNICATION NETWORK

(71) Applicant: T-Mobile USA, Inc., Bellevue, WA (US)

(72) Inventor: Alex Gardini Vedovatto, Walnut Creek, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 410 days.

(21) Appl. No.: 17/537,013

(22) Filed: Nov. 29, 2021

(65) Prior Publication Data

US 2023/0169424 A1    Jun. 1, 2023

(51) Int. Cl.
| | |
|---|---|
| *G06Q 10/0631* | (2023.01) |
| *G06Q 10/1053* | (2023.01) |
| *H04W 24/00* | (2009.01) |
| *H04W 24/02* | (2009.01) |
| *H04W 24/04* | (2009.01) |

(52) U.S. Cl.
CPC .  *G06Q 10/063112* (2013.01); *G06Q 10/1053* (2013.01); *H04W 24/00* (2013.01); *H04W 24/02* (2013.01); *H04W 24/04* (2013.01)

(58) Field of Classification Search
CPC ...... G06Q 10/063112; G06Q 10/1053; H04W 24/00; H04W 24/02; H04W 24/04; H04W 24/08
See application file for complete search history.

(56) References Cited

U.S. PATENT DOCUMENTS

| | | |
|---|---|---|
| 7,113,853 B2 | 9/2006 | Hecklinger |
| 7,120,589 B1 | 10/2006 | Szabo et al. |
| 7,127,707 B1 | 10/2006 | Mishra et al. |
| 7,558,834 B2 | 7/2009 | Embree et al. |
| 7,735,065 B2 | 6/2010 | Jain et al. |
| 8,024,211 B1 | 9/2011 | Cohen |
| 8,719,073 B1 | 5/2014 | Kirshenbaum et al. |

(Continued)

FOREIGN PATENT DOCUMENTS

| | | |
|---|---|---|
| CN | 101916410 A | 12/2010 |
| CN | 101903874 B | 5/2015 |

(Continued)

*Primary Examiner* — Mohammed S Chowdhury
(74) *Attorney, Agent, or Firm* — Perkins Coie LLP

(57) ABSTRACT

Disclosed here is a system to make resource allocation suggestions. The system obtains the multiple issues associated with a wireless telecommunication network, where an issue among the multiple issues impacts a UE associated with the wireless telecommunication network. The system determines a first category among the multiple categories, and a number of issues associated with the category and resolved by a resource capable of fixing the issue among multiple resources capable of fixing the issue. The system determines a second category associated with the issue. The system determines that the first category and the second category match. Upon determining that the first category and the second category match, the system determines a second resource capable of fixing the issue among the multiple resources capable of fixing the issue. The system assigns the issue to the second resource capable of fixing the issue.

14 Claims, 16 Drawing Sheets

(56) References Cited

U.S. PATENT DOCUMENTS

| | | |
|---|---|---|
| 9,141,378 B2 | 9/2015 | Fox et al. |
| 9,489,250 B2 | 11/2016 | Raja Rao |
| 9,489,457 B2 | 11/2016 | Regan et al. |
| 9,514,534 B2 | 12/2016 | Dunn et al. |
| 9,519,936 B2 | 12/2016 | Vijayaraghavan et al. |
| 9,557,735 B2 | 1/2017 | Firkins et al. |
| 9,569,782 B1 | 2/2017 | Lavery et al. |
| 9,710,550 B2 | 7/2017 | Krusell et al. |
| 9,967,793 B2 | 5/2018 | Travostino et al. |
| 10,063,406 B2 | 8/2018 | Tapia et al. |
| 10,067,983 B2 | 9/2018 | Akula et al. |
| 10,313,901 B2 | 6/2019 | Ekambaram et al. |
| 10,339,456 B2 | 7/2019 | Hui et al. |
| 10,339,542 B2 | 7/2019 | Cicchitto et al. |
| 10,373,094 B2 | 8/2019 | Naous et al. |
| 10,380,520 B2 | 8/2019 | Srivastava et al. |
| 10,503,478 B2 | 12/2019 | Maurya et al. |
| 10,708,795 B2 | 7/2020 | Tapia |
| 10,878,193 B2 | 12/2020 | Kosaka |
| 10,878,439 B2 | 12/2020 | Kothe et al. |
| 10,885,448 B2 | 1/2021 | Germanakos et al. |
| 10,951,764 B2 | 3/2021 | Yokel et al. |
| 2011/0137707 A1 | 6/2011 | Winfield et al. |
| 2012/0323640 A1 | 12/2012 | Sabharwal |
| 2014/0019368 A1 | 1/2014 | Noh et al. |
| 2014/0025527 A1 | 1/2014 | Noh et al. |
| 2014/0379434 A1 | 12/2014 | Zangwill |
| 2016/0283995 A1 | 9/2016 | Matula et al. |
| 2017/0026401 A1 | 1/2017 | Polyakov |
| 2017/0076296 A1* | 3/2017 | Hirpara ................. G06Q 50/04 |
| 2017/0353991 A1* | 12/2017 | Tapia ..................... G06Q 10/20 |
| 2018/0131810 A1* | 5/2018 | Yokel ................. H04M 3/5233 |
| 2018/0165258 A1 | 6/2018 | Scoda |
| 2018/0335996 A1 | 11/2018 | Chen et al. |
| 2019/0158366 A1 | 5/2019 | Higgins et al. |
| 2019/0246240 A1 | 8/2019 | Koohmarey et al. |
| 2020/0336396 A1* | 10/2020 | Su ......................... H04L 43/065 |
| 2021/0029559 A1 | 1/2021 | Agarwal et al. |
| 2021/0037400 A1 | 2/2021 | Yao et al. |
| 2021/0091998 A1 | 3/2021 | Ellis et al. |
| 2021/0160719 A1 | 5/2021 | Winter et al. |
| 2021/0184914 A1 | 6/2021 | Myneni et al. |
| 2021/0218630 A1 | 7/2021 | Lu et al. |
| 2021/0258792 A1 | 8/2021 | Rodriguez Bravo et al. |

FOREIGN PATENT DOCUMENTS

| | | |
|---|---|---|
| CN | 102510400 B | 9/2015 |
| CN | 105894322 A | 8/2016 |
| CN | 103329151 B | 9/2016 |
| CN | 107924414 A | 4/2018 |
| CN | 105008858 B | 10/2018 |
| CN | 109034818 A | 12/2018 |
| CN | 109614555 A | 4/2019 |
| CN | 109640276 A | 4/2019 |
| CN | 107070654 B | 11/2020 |
| CN | 112335278 A | 2/2021 |
| CN | 110147503 B | 8/2021 |
| DE | 10061470 C2 | 1/2003 |
| DE | 10057011 B4 | 11/2006 |
| DE | 10340587 B4 | 5/2008 |
| DE | 102009040570 A1 | 4/2010 |
| DE | 102012206283 B4 | 4/2013 |
| DE | 102012221927 A1 | 6/2013 |
| DE | 202013007580 U1 | 11/2014 |
| DE | 102014118910 A1 | 7/2015 |
| DE | 102015103973 A1 | 10/2015 |
| DE | 102015209220 A1 | 12/2015 |
| DE | 202014010940 U1 | 1/2017 |
| DE | 202016107425 U1 | 8/2017 |
| DE | 202017105864 U1 | 1/2018 |
| DE | 102008053547 B4 | 3/2018 |
| DE | 112015003302 B4 | 8/2019 |
| DE | 112017005885 T5 | 8/2019 |
| DE | 102015017082 B3 | 8/2020 |
| DE | 102020104005 A1 | 8/2020 |
| DE | 102020118005 A1 | 2/2021 |
| DE | 102009046542 B4 | 6/2021 |
| EP | 2612261 A2 | 7/2013 |
| EP | 2671169 A2 | 12/2013 |
| EP | 3269164 A1 | 1/2018 |
| EP | 3844643 A1 | 7/2021 |
| JP | 2001293935 A | 10/2001 |
| JP | 2002528012 A | 8/2002 |
| JP | 2004046781 A | 2/2004 |
| JP | 2004145475 A | 5/2004 |
| JP | 2005502932 A | 1/2005 |
| JP | 2005527859 A | 9/2005 |
| JP | 2006074779 A | 3/2006 |
| JP | 2007172515 A | 7/2007 |
| JP | 2007172518 A | 7/2007 |
| JP | 2008059577 A | 3/2008 |
| JP | 2009500877 A | 1/2009 |
| JP | 5102758 B2 | 10/2012 |
| JP | 2017518012 A | 6/2017 |
| JP | 6878700 B2 | 5/2021 |
| KR | 101735312 B1 | 5/2017 |
| KR | 20180044111 A | 5/2018 |
| WO | 2008126931 A1 | 10/2008 |
| WO | 2012050927 A2 | 4/2012 |
| WO | 2013062481 A1 | 5/2013 |
| WO | 2015163915 A1 | 10/2015 |
| WO | 2018215827 A1 | 11/2018 |

\* cited by examiner

FIG. 3B

| Impact on Customer | Impacted Metric Relevance |
|---|---|
| No coverage | 1 |
| Call drop | 0.9 |
| Access Failure | 0.9 |
| Poor voice quality DL | 0.8 |
| Poor voice quality UL | 0.8 |
| Low Speed DL | 0.8 |
| Low Speed UL | 0.8 |
| User on UMTS or GSM | 0.7 |
| Other Impact | 0.01 to 0.7 |
| No Impact | 0 |

*FIG. 5*

| Issue name (examples) | Issue Severity |
|---|---|
| Poor DL Throughput | 1 |
| Mid Band Layers Imbalance | 0.9 |
| Low Band Traffic Too High | 0.9 |
| Cell Site Router Misconfigured | 0.8 |
| CA Not Working | 0.7 |
| Under Powered Cell LTE | 0.6 |
| Poor CQI | 0.5 |
| RET mismatch in the same cell | 0.3 |
| PCI Collision | 0.1 |

*FIG. 6*

UL Speed Rule — 710

| UL Speed Rule | CCE — 440 |
|---|---|
| UL TP > 1Mbps | 0.1 |
| 1Mbps > UL TP > 50Kbps | Linear |
| UL TP < 50kbps | 1 |

AFR Rule — 730

| AFR Rule | CCE — 440 |
|---|---|
| RACH = 100 | 0 |
| 100 > RACH > 0 | Linear |
| RACH = 0 | 1 |

DL Speed Rule — 700

| DL Speed Rule | CCE — 440 |
|---|---|
| DL TP > 10Mbps | 0.1 |
| 10Mbps > UL TP > 1Mbps | Linear |
| DL TP < 1Mbps | 1 |

RACH SR Rule — 720

| RACH SR Rule | CCE — 440 |
|---|---|
| RACH = 100 | 0 |
| 100 > RACH > 0 | Linear |
| RACH = 0 | 1 |

*FIG. 7*

| Site | Sector | Cell | Issue Category | Issue Flagged | Net Customers Impacted | Issue Longevity (days) |
|---|---|---|---|---|---|---|
| HO1036A | HO109BA2 | TH01036A2Z | Underperformers | Poor Voice Quality | 684 | 0 |
| HO1062B | | | Underperformers | Poor Mobile Performance | 634 | 9 |
| HO5003A | HO5003A2 | LH05003A21 | Underperformers | Poor UL Throughput | 636 | 2 |
| HO5003A | HO5003A2 | LH05003A21 | Underperformers | Poor UL Throughput < 5dB | 636 | 2 |
| HO5003A | HO5003A1 | LH05003A11 | RX Power | RX Power Imbalance > 5dB | 538 | 19 |
| HO1126A | | | Underperformers | Poor Mobile Performance | 403 | 0 |

*FIG. 8*

TRACKING ISSUES AND RESOLUTION OF SAME IN A WIRELESS COMMUNICATION NETWORK

BACKGROUND

Wireless telecommunication providers use many different software packages to track hardware and software issues occurring in the wireless telecommunication network, leaving engineers having to review multiple different sources of problems. In addition, the multiple different sources of problems are not integrated with each other. Consequently, the relative importance of issues and the order in which they should be fixed is not clear.

BRIEF DESCRIPTION OF THE DRAWINGS

Detailed descriptions of implementations of the present invention will be described and explained through the use of the accompanying drawings.

FIGS. 3A-3B show categorizations of issues.

FIG. 5 shows an example of impacted metric.

FIG. 6 shows an example of issue severity.

FIG. 7 shows an example of current user equipment (UE) experience.

FIG. 8 shows a prioritized list, which can be presented to an engineer.

Figure 1:
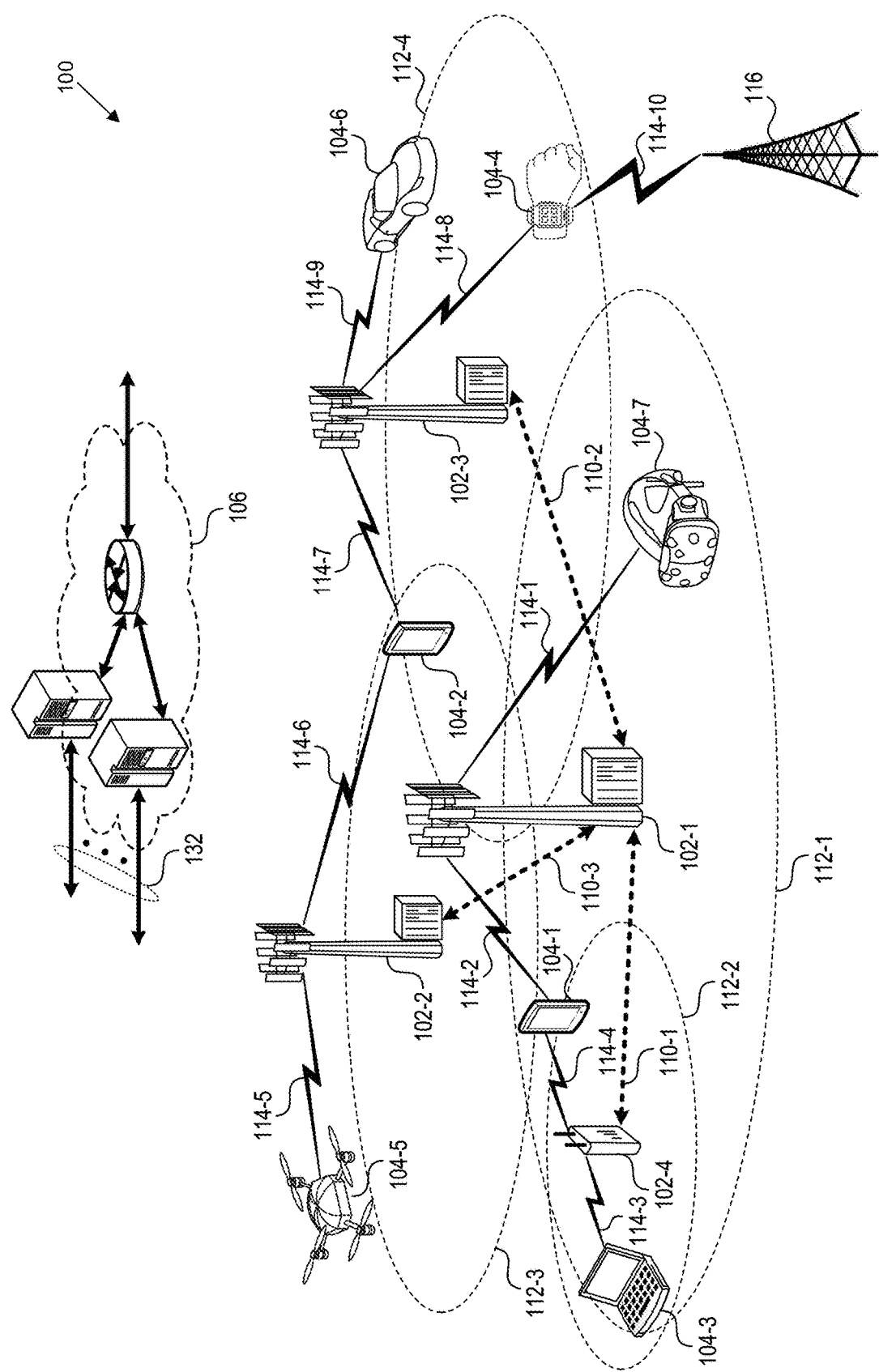
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method for providing a single platform prioritizing multiple issues associated with a wireless telecommunication network. The issue impacts a mobile device associated with the wireless telecommunication network and can be a hardware or software issue, such as a misdirected antenna, a misconfigured amplifier, a software bug, etc. The system can identify the multiple issues associated with the wireless telecommunication network. The system can obtain a number of mobile devices impacted by the issue, an indication of importance of impacted metric, an indication of importance of severity associated with the issue, and an indication of importance of current UE experience, e.g. current mobile device experience. The impacted metric indicates relevance of type of issue to the mobile device. Issue severity is a multiplier representing how much impact an issue has on the impacted metric. Current UE experience adds more weight when current UE experience is bad on the metric impacted by the issue. Based on the number of mobile devices impacted by the issue, the indication of importance of impacted metric, the indication of importance of severity of the issue, and the indication of importance of current mobile device experience, the system can compute a priority associated with the issue and prioritize the multiple issues to obtain a prioritized list. In addition, the system can obtain a guidance indicating how to address the multiple issues. The system can provide to an engineer the prioritized list indicating an order in which to resolve the multiple issues along with the guidance indicating how to address the multiple issues.

In addition, the system can make resource allocation suggestions based on tracking issues and availability of resources. Resource allocation suggestions can include making hiring suggestions, assigning issues to engineers, reassigning engineers to different geographical regions, and reassigning issues to different engineers. The system can obtain the multiple issues associated with the wireless telecommunication network. The system can obtain multiple categories associated with the multiple issues, where the categories can include poor download throughput, poor upload throughput, degraded coverage, poor voice quality, etc. The category associated with the issue can indicate a skill needed to resolve the issue.

To assign an issue to an engineer, the system can find a category that matches a category associated with the issue. Upon finding the match, the system can determine a second engineer among multiple engineers who has resolved the most issues in that category. The system can assign the issue to the engineer.

To make a hiring suggestion, the system can rank the multiple categories based on a number of corresponding unresolved issues to obtain a ranking. Based on the ranking, the system can make a hiring suggestion indicating a needed skill.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Figure 2:
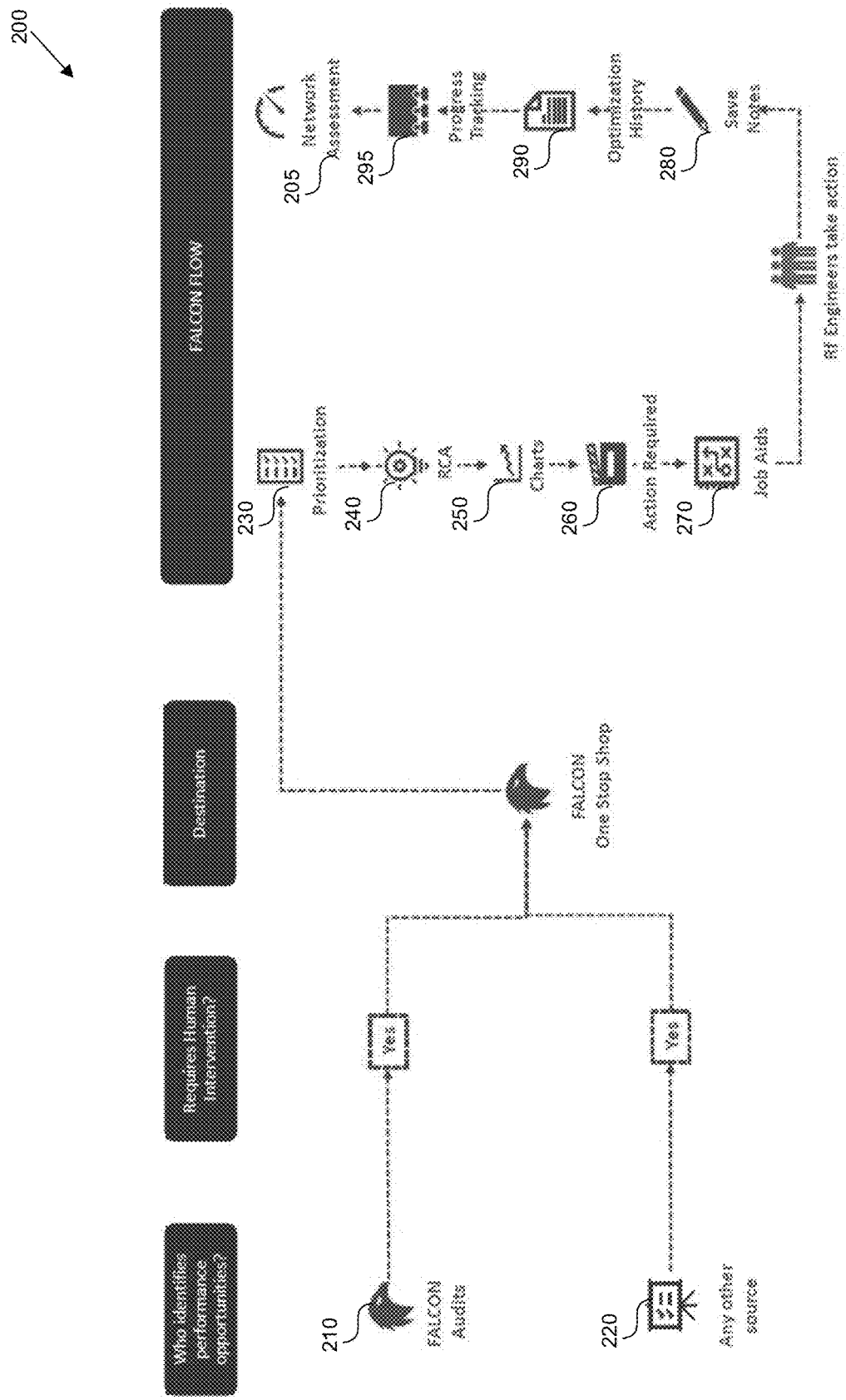
FIG. 2 shows a system to prioritize multiple issues associated with the wireless telecommunication network, automatically assign the issue to an engineer, and track the resolution of the issue.

Prioritizing Multiple Issues Associated with a Wireless Telecommunication Network FIG. 2 shows a system to prioritize multiple issues associated with the wireless telecommunication network, automatically assign the issue to an engineer, and track the resolution of the issue. The system 200 provides a single platform where multiple issues associated with network 100 are prioritized, resolved, and tracked.

The system 200 in steps 210, 220 can audit the network 100. The system 200 can gather log files from various network 100 components. The log files can include information about configuration parameters of the various network 100 components including software and hardware configuration parameters, key performance indices (KPIs), and/or site configuration. The software and hardware configuration parameters can include power configuration, layer management configuration, etc. The KPIs can include number of dropped calls, number of access timeouts, number of packets lost, network speed, voice quality of the network, etc. The site configuration can include antenna configuration, radio configuration, hardware specification, etc.

The system 200 can analyze the log files to determine multiple issues associated with the network 100. The multiple issues can include whether a site has wrong power configuration, whether the site has a broken antenna, whether the site has a parameter that is not configured properly, or a functionality that is not configured properly. The system 200 can perform multiple checks every day, such as two checks every day.

For example, when performing the audit in steps 210, 220, the system can detect whether a tower mounted amplifier (TMA) is configured properly. The TMA amplifies weak uplink signals from mobile devices, providing improved balance between Rx and Tx signals, and removes interference, improving network performance and site coverage. The Tx is the signal level emitted by the UE. The Rx sensitivity is the incoming signal level received by the network 100 from the UE.

When configured properly; the TMA has two low noise amplifiers (LNAs) inside, Every cell that has a TMA should be configured with two LNAs. The system 200 can go into the configuration of the cell and check whether the site has a TMA by checking if, in the configuration of the cell site, TMA is in the list of the hardware in the cell site. Upon confirming that the site has a TMA, the system 200 can check the configuration file to see if there are two LNAs configured. If there is only one or no element name is configured, the system 200 flags this as an issue, namely that the site is misconfigured.

Based on the log files, the system 200 in step 230 can perform prioritization of the multiple issues identified in the network, as described below. In step 240, the system 200 can identify root cause analysis (RCA) of a particular issue. RCA does some preliminary investigation of the issues and provides some suggestions to the engineer. RCA can be decomposed into four steps: 1) identify and describe the problem clearly; 2) establish a timeline from the normal situation up to the time the problem occurred; 3) distinguish between the root cause and other causal factors (e.g., using event correlation); and 4) establish a causal graph between the root cause and the problem. RCA generally serves as input to a remediation process whereby corrective actions are taken to prevent the problem from reoccurring.

In step 250, the system 200 can provide charts, as explained in this application, to identify the highest prioritized issues. In step 260, the system 200 indicates the action required, and in step 270, the system provides a job aid describing how to deploy on the action required.

In step 280, the system 200 can record notes about everything that the engineer is working on. For example, the notes can record that an antenna was set in a particular direction in connection with resolving a particular issue. In step 290, the system 200 keeps optimization history. The system 200 can use the optimization history and saved notes to automatically create job aids. For example, the system 200 can automatically categorize the optimization histories and saved notes into a predefined category. The next time an issue falls into the predefined category, the system 200 retrieves the optimization history and saved notes to guide the resolution of the new issue.

In step 295, the system 200 creates a progress report based on how close the issue is to resolution. For example, the progress report can indicate how many steps indicated in the job aids have been executed.

In step 205, the system 200 can generate a network assessment score, which is a score indicating how many UEs are affected by outstanding issues in a particular section of the network 100. The network assessment score can vary within a predetermined range such as between 0 and 100. The network assessment score of 100 means that the particular section of the network 100 has resolved all the issues, and the network performance is at the maximum. The network assessment score of 85 means that the particular section of the network has many issues to resolve.

Figure 3A:
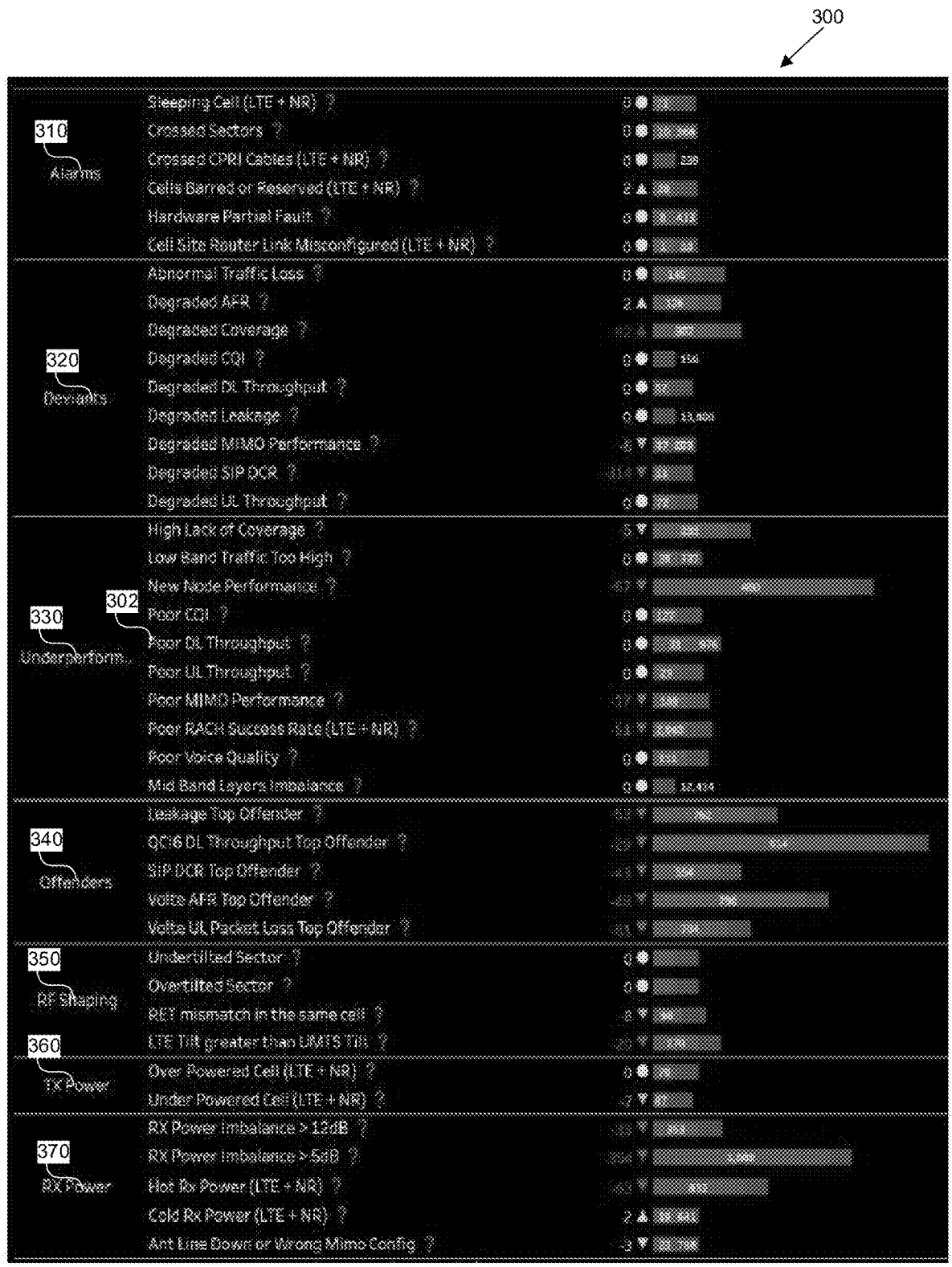
Figure 3B:
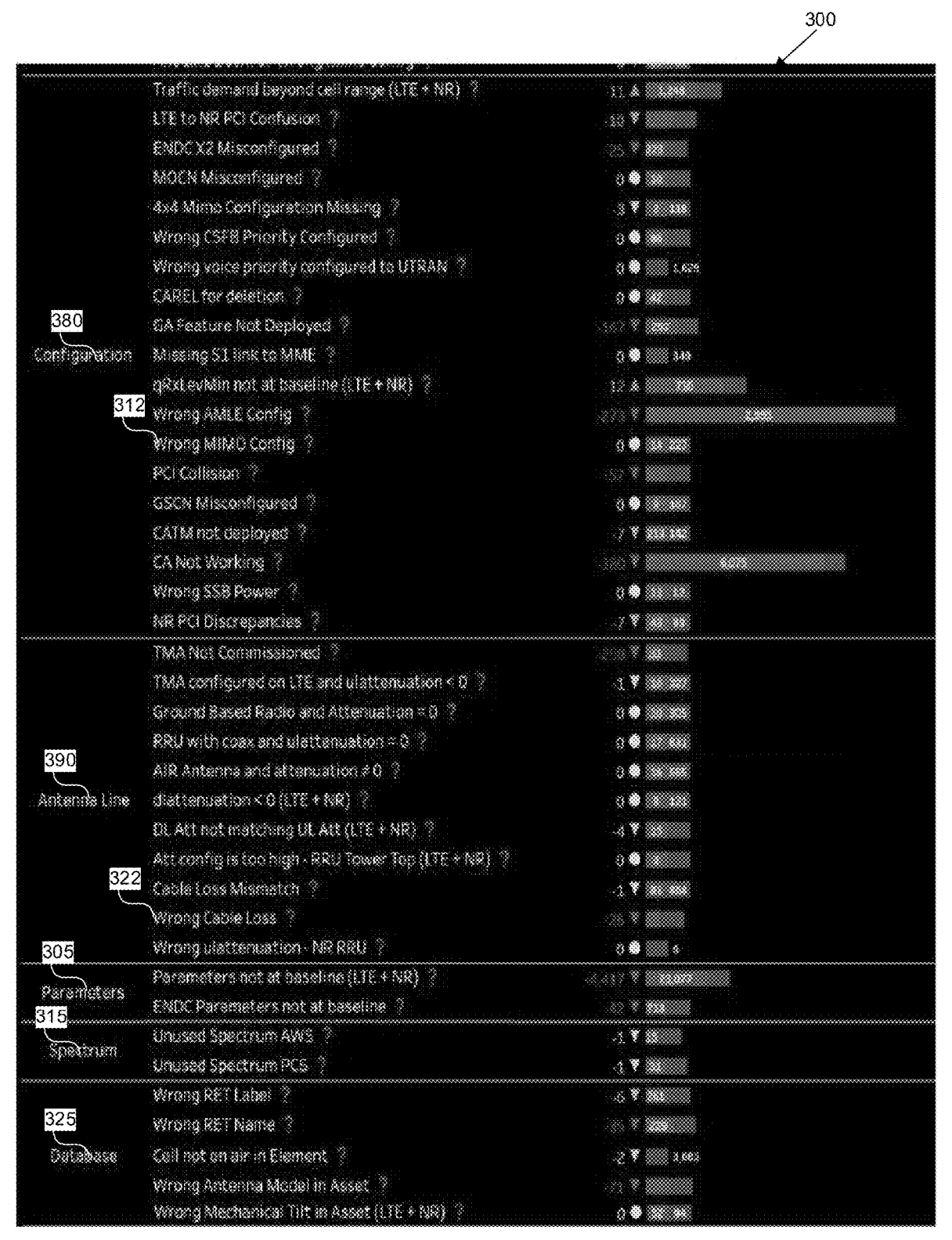

FIGS. 3A-3B show categorizations of issues. The issues included in the categorization 300 of issues can cover issues with various networks such as 5G, 4G, 3G, etc. In one dashboard as shown in FIG. 3, the categorization 300 of issues includes multiple categories such as: alarms 310, deviants 320, underperformers 330, offenders 340, radiofrequency (RF) shaping 350, Tx power 360, Rx power 370, configuration 380, antenna line 390, parameters 305, spectrum 315, database 325. Some of the categories are discussed below.

Each category 310-325 can have multiple metrics, e.g., types 302, 312, 322 (only three labeled for brevity). For example, the system 200 in FIG. 2 can categorize a new issue into one of the pre-existing categories 310, 320, 330,

340, 350, 360, 370, 380, 390, 305, 315, 325 and one of the pre-existing types 302, 312, 322. Based on the categorization, the system 200 can provide solutions to the problem and can determine prioritization of the issue, as explained this application.

The category alarms 310 can include types such as: sleeping cells, crossed sectors, hardware partial fault, cell site router misconfigured, etc. Category deviants 320 includes types such as abnormal traffic loss, degraded download speed, degraded upload speed, etc. Category deviants 320 includes types that indicate a degradation in an average performance. For example, average download speed that a UE is getting from a particular cell site all of a sudden is much worse than it used to be. Category deviants 320 includes types that correspond to key performance indices (KPIs) that the system 200 is tracking, but which suddenly have degraded performance. For example, the type degraded coverage can indicate that 1,431 cell sites are flagged for deviation. The degraded coverage can indicate that many more customers are losing coverage and experiencing low service on their phones.

The category underperformers 330 includes types such as high lack of coverage, poor voice quality for download throughput, poor upload throughput, etc. The category underperformers 330 indicates cell sites where the UE is experiencing degraded performance.

The category offenders 340 includes types such as leakage top offender, throughput top offender, VoLTE AFR top offender, etc.

The category RF shaping 350 includes types such as underutilized sector, overutilized sector, etc. The category RF shaping 350 indicates whether the antenna associated with a cell site is pointed in an optimal direction. The direction of the antenna significantly impacts the quality of service provided by that antenna, such as signal strength. The direction in front of the antenna receives better signal than other directions. The system 200 by performing the audit in steps 210, 220 in FIG. 2 can identify if the intended direction is optimal. To determine whether the intended direction is optimal, the system 200 can compare the antenna direction to the configuration on the cell site, to the terrain, buildings in the area, height of the antenna, and based on all these parameters, the system 200 can determine whether the antenna direction is optimal.

The category Tx power 360 includes types such as overpowered cell, underpowered cell, etc. The category Tx power 360 indicates the power of the signal sent by the UE.

The category Rx power 370 includes types such as antenna line down or wrong MIMO configuration, cold Rx power, hot Rx power, Rx power imbalance over 5 dB, Rx power imbalance over 12 dB, etc. The category Rx power 370 indicates the power of the signal received by the antenna. Ideally, the cell site would only receive the signal from the UE, but there may be other undesired, interfering signals that the cell tower receives. For example, interference. For example, the cell site can receive a signal from an illegal device, or if the UE is close to a rusty object, the rusty object may create a signal that competes with the signal from the UE.

The category configuration 380 includes types such as traffic demand beyond cell range, wrong MIMO configuration, wrong voice priority configured to UTRAN, etc. The configuration is how network operators define network parameters and activate the features in the network 100. Once the hardware is installed, and the equipment is deployed, the equipment needs to be configured to activate certain equipment features. For example, carrier aggregation is the ability of the UE to use different frequencies to communicate with the cell site at the same time. Carrier aggregation allows the UEs to receive much faster and much better speed. Carrier aggregation is a complex feature that needs to be configured and has many parameters. The system 200 can check whether the carrier aggregation has proper parameters. If carrier aggregation does not have proper parameters, the system flags parameters associated with carrier aggregation as an issue for an engineer to address.

Figure 4:
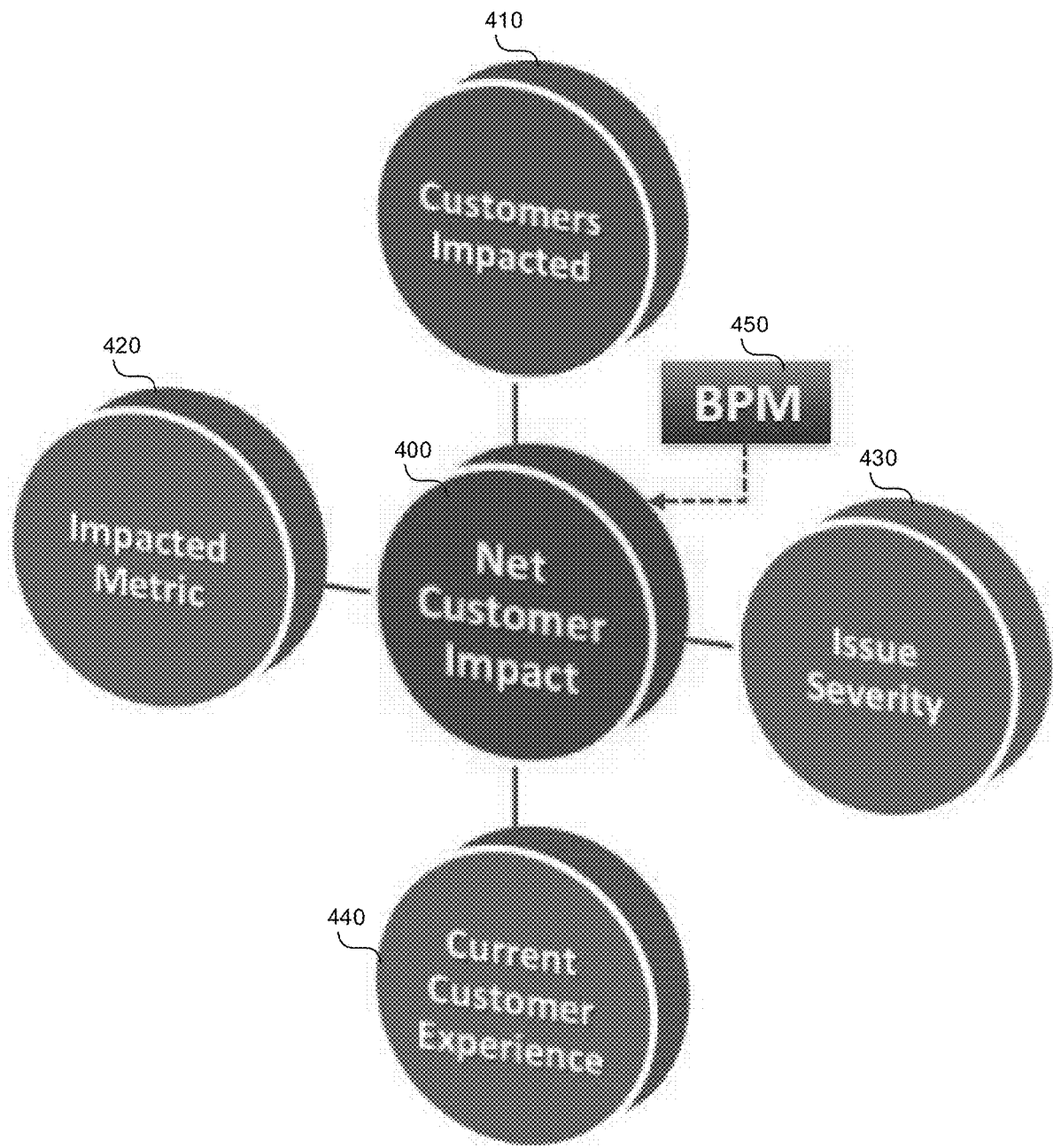
FIG. 4 shows the computation of the priority.

FIG. 4 shows the computation of the priority. The priority 400 can be computed based on four or five of the following inputs: number of users impacted 410, impacted metric 420, issue severity 430, current UE experience 440, priority multiplier 450. [[Alex, do you use both impacted metric and issue severity, or only issue severity in the current system?]]

priority 400=number of users impacted*impacted metric*issue severity*current UE experience*priority multiplier.

The number of users impacted 410 represents the total number of users impacted by a particular issue. The number of users impacted 410 does not by itself determine the priority of the issue because the number of users impacted provides incomplete information. For example, the issue can impact 1,000 users, but the impact is so minimal and their experience is already so good that the issue is not relevant even though it is affecting 1,000 users. By contrast, another issue may be affecting 100 customers elsewhere, but these customers are highly affected by the issue, and they are likely to switch networks 100. Consequently, the inputs impacted metric 420, issue severity 430, current UE experience 440 capture the impact of the issue on the customer.

The impacted metric 420 or "Impact Severity" reflects what kind of problem the UE can perceive due to the issue. No coverage at all is the most severe impact, followed by call drops, slow speed and poor voice quality, etc.

The issue severity 430 or "Issue Relevance" reflects how much fixing that issue can help to improve the impacted metric. If fixing the issue can help significantly, then issue severity 430 has high weight and high priority.

Priority multiplier 450 adds more weight to issues that need to be strategically prioritized such as 5G issues. Even though the issues might have a low number of customers impacted due to low numbers of overall users and due to the fact that the 5G network is a nascent technology, the network operators can decide to weigh issues relating to the 5G network highly because deploying an operational 5G network is a high priority for future users.

FIG. 5 shows an example of an impacted metric. Impacted metric 420 is a multiplier representing the relevance of the impacted metric to the user. The impacted metric 420 can vary within a predetermined range such as 0-1, where one is the most impactful, and 0 is least impactful. The impacted metric 420, represented by table 500, can be stored in a database that lists the categories 310-325 in FIGS. 3A-3B, and types 302, 312, 322. For example, an issue 510 that causes a UE to have no coverage gets more weight than an issue 520 that causes call drop, which gets more weight than an issue 530A, 530B that causes slow upload (UL) or download (DL) speed, as can be seen in table 500. Impacted metric 420 is an optional multiplier. The value of the impacted metric 420 can be represented by the issue severity 430 in FIG. 4.

FIG. 6 shows an example of issue severity. Issue severity 430 is a multiplier representing how much impact an issue has on the impacted metric 420. The issue severity 430 can vary within a predetermined range such as 0-1, where one is the most impactful, and 0 is least impactful. The issue severity 430, represented by table 600, can be stored in a database that lists the categories 310-325 in FIGS. 3A-3B, and types 302, 312, 322. For example, an issue 610 indicating that carrier aggregation is not working has more impact on DL speed than an issue 620 indicating poor channel quality indicator (CQI), therefore issue 610 gets more weight.

FIG. 7 shows an example of current UE experience. Current UE experience 440 adds more weight when current UE experience is bad on the metric impacted by the issue. The current UE experience 440 can vary within a predetermined range such as 0-1, where one is the most impactful, and 0 is least impactful. The current UE experience 440, represented by table 700, can be stored in a database that lists the categories 310-325 in FIGS. 3A-3B, and types 302, 312, 322.

Table 700, 710, 720, 730 shows various tools to determine the current UE experience 440. For example, carrier aggregation not configured impacts DL speed. If DL speed in the sector is good, this issue gets less weight compared to a sector with poor DL speed. Specifically, as seen in table 700, when the download speed is greater than 10 Mb per second, the current UE experience 440 gets the weight of 0.1. When the download speed is less than 1 Mb per second, the current UE experience gets the weight of 1. In between 1 Mb per second and 10 Mb per second, the weight is linearly interpolated between 0.1 and 1. The weights are similarly computed for the uplink speed, as shown in table 710.

Table 720 shows the computation of current UE experience 440 for a random-access channel (RACH). RACH SR stands for Random Access Success Rate. RACH is the first procedure the UE goes through to gain access to the network. Table 730 shows the computation of current UE experience 440 for access failure rate (AFR). AFR is the failure rate of the second and final procedure the UE goes through to gain access to the network.

FIG. 8 shows a prioritized list, which can be presented to an engineer. The prioritized list 800 can be a dashboard and can identify the site 810, sector 820, and cell 830 having the issue. The prioritized list 800 can indicate the category 840 to which the issue belongs. The category 840 can be a category 310, 320, 330, 340, 350, 360, 370, 380, 390, 305, 315, 325 in FIGS. 3A-3B. The prioritized list 800 can indicate the type 850 of the issue. The type 850 can be a type 302, 312, 322 in FIGS. 3A-3B. The prioritized list 800 can indicate the priority 400, where the issue 860 with the highest priority is listed first. The prioritized list 800 can indicate the longevity 870 of the issue.

For example, the issue 860 indicating poor voice quality has a priority of 684, which is the highest priority in the list. The highest priority in the prioritized list 800 indicates the highest relevance to the user. The engineer can address the issue based on the order represented in the prioritized list 800.

Figure 9:
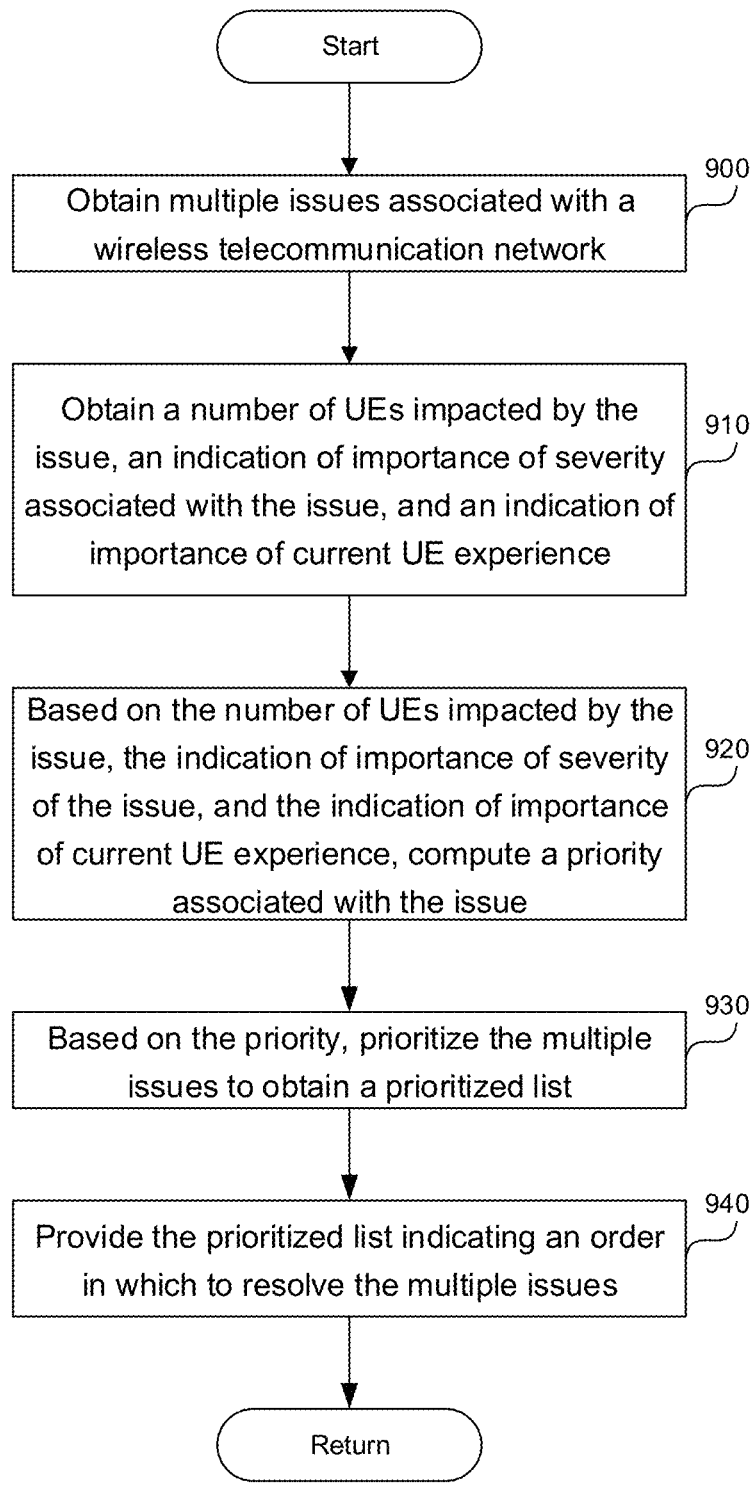
FIG. 9 is a flowchart that illustrates a process to prioritize multiple issues associated with a wireless telecommunication network.

FIG. 9 is a flowchart that illustrates a process to prioritize multiple issues associated with a wireless telecommunication network. A hardware or software processor executing instructions described in this application provides a single platform to gather, prioritize, indicate a resolution, and track resolution of issues associated with a wireless telecommunication network. Consequently, an engineer does not need to have multiple software packages to find issues, determine their priority, and track their resolution.

In step 900, the processor can obtain the multiple issues associated with a wireless telecommunication network. The issue can involve a hardware or a software problem such as a misdirected antenna, a misconfigured amplifier, a cell tower that has stopped working, etc. The issue impacts a UE associated with the wireless telecommunication network. For example, the processor can obtain network logs from various network components such as antennas, sectors, cells, cell towers, etc., and can analyze the logs to determine whether there are issues. In a more specific example, the processor can check whether every cell that should have a TMA also has two LNA elements configured. If not, the processor can flag the lack of configuration as an issue to resolve.

In step 910, the processor can obtain a number of UEs impacted by the issue, an indication of importance of severity associated with the issue, and an indication of importance of current UE experience. In addition, the processor can obtain an importance of an impacted metric, and a priority multiplier indicating importance of the issue to the wireless telecommunication network. While the indication of importance of severity, the indication of importance of current UE experience and the importance of the impacted metric vary within a predetermined range such as 0-1, the priority multiplier weight can exceed the predetermined range. The impacted metric indicates relevance of type of issue to the mobile device. The type associated with the issue can be a type 302, 312, 322 in FIGS. 3A-3B.

To obtain the indication of importance of severity and the indication of importance of the impacted metric, the processor can determine a type associated with the issue. Based on the type associated with the issue, the processor can retrieve from a database a first weight indicating the importance of severity and a second weight indicating the importance of impacted metric. The first weight and the second weight vary within a predetermined range, such as 0-1.

To obtain the indication of importance of current UE experience, the processor can determine a type associated with the issue. The processor can obtain an indication of current UE experience. Based on the type associated with the issue, the processor can retrieve multiple ranges including a first range and a second range, where the first range includes a first weight associated with the first range, and the second range includes a second weight associated with the second range. The processor can determine a range among the multiple ranges to which the indication of the current UE experience belongs. The processor can obtain a weight associated with the determined range, where the weight indicates the importance of the current UE experience.

In step 920, based on the number of UEs impacted by the issue, the indication of importance of severity of the issue, and the indication of importance of current UE experience, the processor can compute a priority associated with the issue, as described in this application.

In step 930, based on the priority, the processor can prioritize the multiple issues to obtain a prioritized list. In step 940, the processor can provide the prioritized list indicating an order in which to resolve the multiple issues.

In one embodiment, to prioritize the multiple issues, the processor can determine a type associated with the issue. Based on the type associated with the issue, the processor can retrieve a first weight indicating the importance of impacted metric, and a second weight indicating the importance of severity, where the first weight and the second weight vary within a predetermined range. The processor can obtain an indication of current UE experience. Based on the type associated with the issue and the indication of current UE experience, the processor can retrieve a third weight indicating the importance of current UE experience, where the third weight varies within the predetermined range. The processor can obtain a fourth weight indicating importance of the issue to the wireless telecommunication network, where the fourth weight can exceed the predetermined range. The processor can combine, e.g., by multiplying, the first weight, the second weight, the third weight, the fourth weight, and the number of mobile devices impacted by the issue to obtain a numerical indication associated with the priority of the issue. The processor can prioritize the multiple issues based on the numerical indication associated with the priority of the issue.

In another embodiment, to prioritize the multiple issues, the processor can combine the second weight indicating the importance of severity, the third weight indicating the importance of current UE experience, and the number of mobile devices impacted by the issue to calculate the priority of the issue.

The processor can indicate a resolution of the issue. The processor can obtain a guidance indicating how to address the multiple issues. The processor can compile the guidance based on prior optimization history in notes saved while resolving a similar issue. The guidance can be curated by experts in the field. The processor can provide the prioritized list indicating an order in which to resolve the multiple issues along with the guidance indicating how to address the multiple issues. A similar issue is an issue that has the same type. To provide guidance, the processor can find issues having the same type because the two issues are more likely to be similar than two issues that have the same category, but different types.

Figure 10:
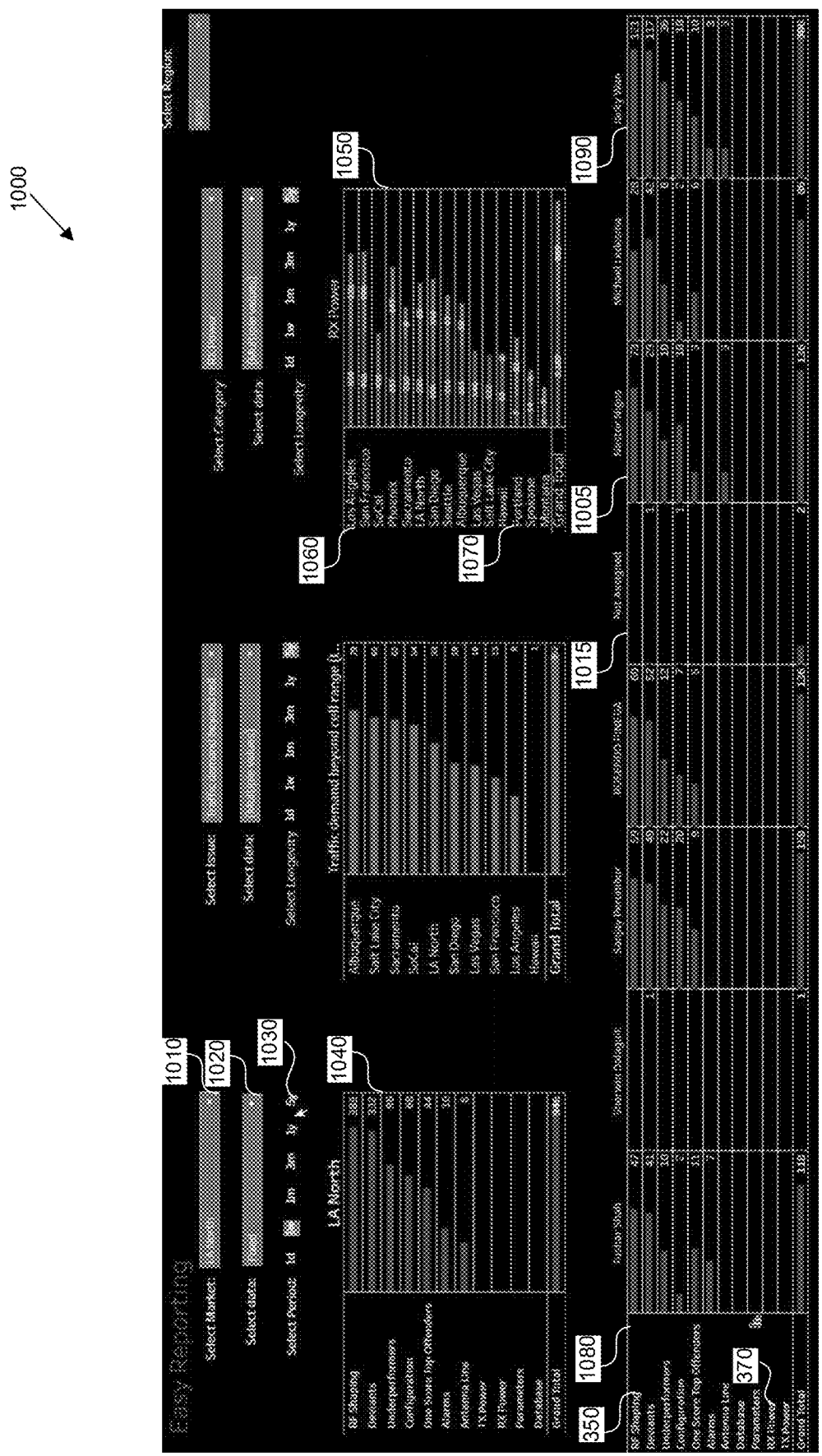
FIG. 10 shows a dashboard tracking issues per market, per category, and per engineer.

Tracking Issues and Resolution of Issues in a Wireless Telecommunication Network FIG. 10 shows a dashboard 1000 tracking issues per market, per category, and per engineer. Element 1010 enables a user to select a geographical region. Element 1020 enables the user to select the type of data to show, such as fixed issues. Element 1030 enables the user to select the period of time such as 1 day, 1 week, 1 month, 3 months, 1 year or 5 years. Element 1040 shows the number of issues fixed for the selected geographical region. The issues are sorted into categories 310, 320, 330, 340, 350, 360, 370, 380, 390, 305, 315, 325 in FIGS. 3A-3B.

Element 1050 shows a particular issue, such as Rx power 370, and number of issues falling into the Rx power 370 category for each team 1060, 1070 (only two labeled for brevity). The teams 1060, 1070 can correspond to geographical regions.

Element 1080 shows a number of issues fixed per engineer 1090, 1005 (only two labeled for brevity), per category 350, 370 (only two labeled for brevity). Element 1080 can show the engineers belonging to the geographical region selected in element 1010. Column 1015 shows unassigned issues in the geographical region selected in element 1010.

The system can assign issues to engineers automatically. For example, when the system identifies the issue, the system can automatically determine the category 310, 320, 330, 340, 350, 360, 370, 380, 390, 305, 315, 325 to which the issue belongs. In addition, the system can determine a geographical region in which the issue is occurring. Based on the geographical region, the system can determine the engineers working in the geographical region. From those engineers, the system can determine an engineer best suited to resolving the issue.

For example, if an issue belonging to category RF shaping 350 comes up, the system can determine that the engineer Jacky Wan has fixed 121 of such issues where the second most efficient engineer has fixed 73 of such issues. The system can automatically assign the new issue to the engineer who has fixed the most issues in that category.

In addition, the system can make hiring recommendations. For example, the system can determine that a particular category of issues such as RF shaping 350 comes up frequently, and there aren't enough engineers to fix issues in the RF shaping category. The system can suggest hiring more engineers having skills to fix RF shaping issues. Alternatively, the system can suggest reassigning engineers working on other issues but capable of fixing RF shaping issues to the current issue.

The system can make hiring decisions based on geographical regions. For example, the system can categorize the incoming RF shaping issues per geographical region, and can assign engineers working in the geographical region to resolving the issue. If there aren't enough engineers in the particular geographical region, the system can suggest hiring more engineers in the particular region having skills to fix the RF shaping issues. Alternatively, the system can suggest reassigning engineers working on other issues or in other geographies, but capable of fixing RF shaping issues to the current issue in the current geographical region.

Further, the system can provide a root cause analysis, that is, insights into why the issues may be occurring. For example, the system can identify an unusual set of circumstances geographically proximate to the issue and bring that unusual set of circumstances to the attention of the engineer. For example, the unusual set of circumstances can include proximity to Disney World, activity on a neighboring site the previous night that impacted the performance of these sites, etc.

Figure 11:
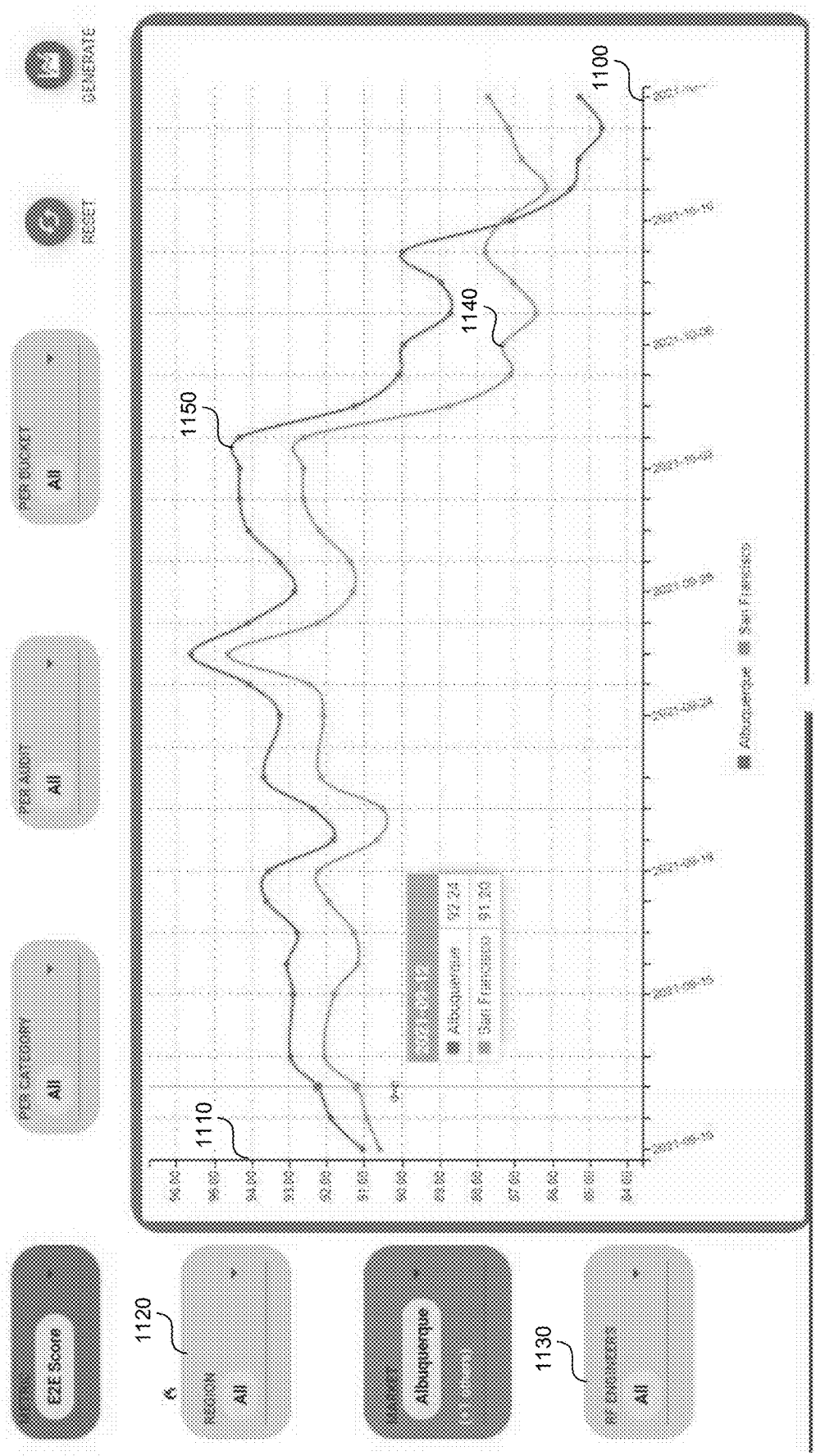
FIG. 11 shows a number of issues over time for various geographical regions.

FIG. 11 shows a number of issues over time for various geographical regions. The X-axis 1100 shows time while the Y-axis 1110 shows a network assessment score indicating a percentage of UEs not affected by the multiple issues. Element 1120 enables selection of a particular region. Element 1130 enables selection of a particular engineer.

Graph 1140 shows the network assessment score over time for a particular market, such as San Francisco, while graph 1150 shows the network assessment score over time for another market, such as Albuquerque. The graphs 1140, 1150 can be analyzed automatically or manually to determine if a particular area is having more issues or slow progress.

For example, if the analysis indicates that a particular area is having more issues or slow progress, the responsible parties, e.g., managers, associated with the particular area are reminded to look into the metrics. In addition, if a particular area is having more UEs impacted by issues and the progress is not good enough, then the system can suggest that more resources be allocated, such as by allocating more engineers or hiring more skilled engineers to help.

Figure 12:
FIG. 12 shows the compliance network assessment score per geographical region.

FIG. 12 shows the compliance network assessment score per geographical region. Column 1200 shows various geographical regions 1220, 1230 (only two labeled for brevity). Column 1210 shows the network assessment score 1225, 1235 (only two labeled for brevity). The network assessment score indicates a percentage of UEs not affected by the multiple issues. The network assessment score can also be interpreted as progress towards optimization, progress towards eliminating issues in the network, or progress towards maximizing the network potential with existing hardware, software, and knowledge.

To compute the network assessment score 1225, 1235 for a particular region 1220, 1230, respectively, the processor can compute the total number of UEs in the particular region, for example a million. Then, the processor can compute the total priority of unresolved issues for the particular region, for example 100,000. The total priority is computed as explained in this application. To compute the network assessment score, the processor performs the following calculation:

$$\text{network assessment score} = \frac{\text{total number of } UEs - \text{total priority of unresolved issues}}{\text{total number of } UEs} \quad (1)$$

The processor can then rank the regions 1220, 1230 according to the network assessment score, where the higher score indicates fewer UEs impacted, while the lower score indicates more UEs impacted. In FIG. 12, region 1220 has the most impacted UEs. If a particular region is consistently below a predetermined threshold, such as 90, the processor can suggest hiring more engineers or reassigning engineers to the particular region.

Figure 13:
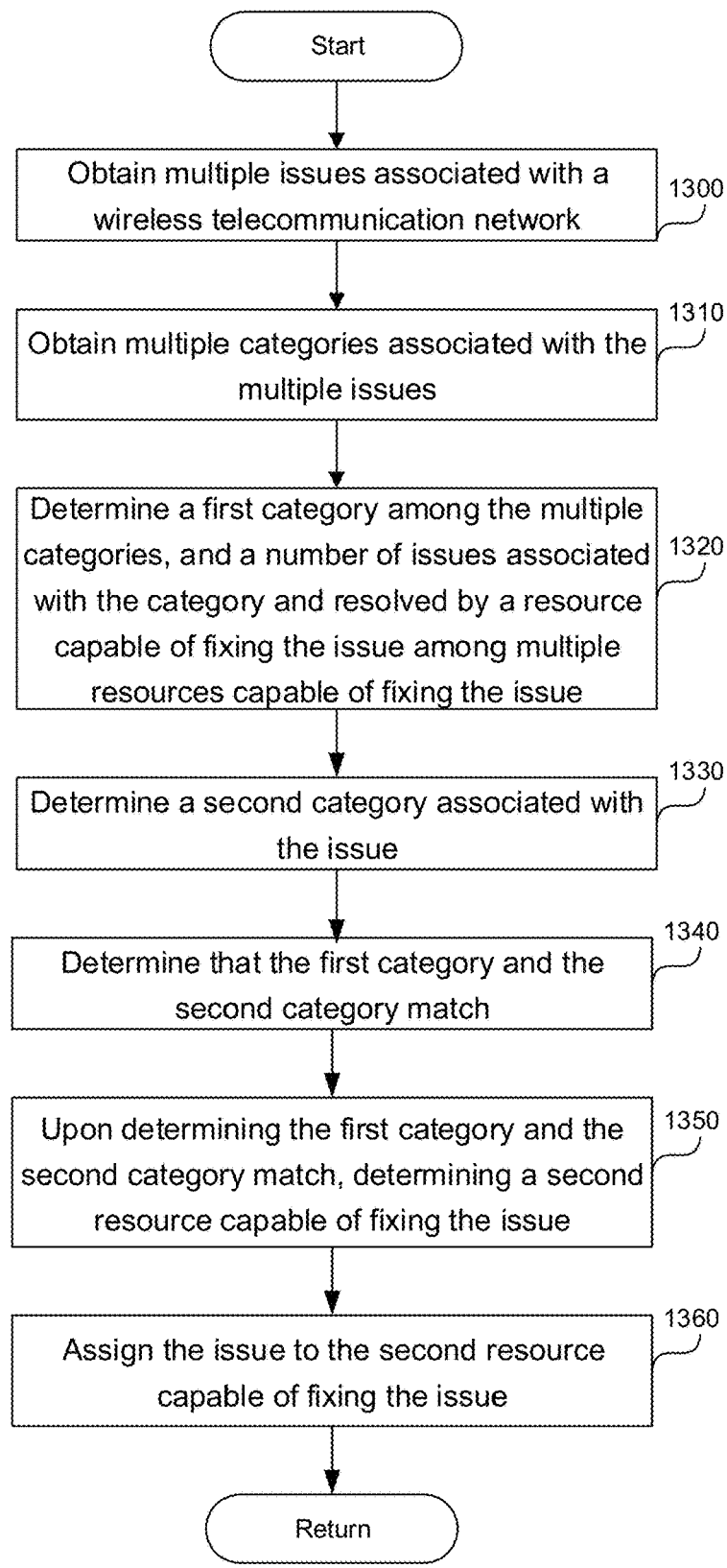
FIG. 13 is a flowchart of a method to assign resolution of an issue associated with a wireless telecommunication network to a resource capable of fixing the issue.

FIG. 13 is a flowchart of a method to assign resolution of an issue associated with a wireless telecommunication network to a resource capable of fixing the issue. The resource capable of fixing the issue can be a software program, a machine learning model, a robot, or an engineer.

In step 1300, a hardware or software processor performing instructions described in this application can obtain the multiple issues associated with a wireless telecommunication network. The issue can involve a hardware or a software problem such as a misdirected antenna, a misconfigured amplifier, a cell tower that has stopped working, etc. The issue impacts a UE associated with the wireless telecommunication network. For example, the processor can obtain network logs from various network components such as antennas, sectors, cells, cell towers, etc., and can analyze the logs to determine whether there are issues. In a more specific example, the processor can check whether every cell that should have a TMA also has two LNAs configured. If not, the processor can flag the lack of configuration as an issue to resolve.

In step 1310, the processor can obtain multiple categories associated with the multiple issues, such as categories 310, 320, 330, 340, 350, 360, 370, 380, 390, 305, 315, 325 in FIGS. 3A-3B.

In step 1320, the processor can determine a first category among the multiple categories, and a number of issues associated with the category and resolved by the resource capable of fixing the issue.

In step 1330, the processor can determine a second category associated with the issue. In step 1340, the processor can determine that the first category and the second category match. The processor can perform the match at the category level, instead of the type level, because a category includes many types. Performing the match at the category level provides access to more resources than performing the match at the type level.

In step 1350, upon determining that the first category and the second category match, the processor can determine a second resource capable of fixing the issue among multiple resources capable of fixing the issue. In addition to determining that the second resource is capable of fixing the issue, the processor can use additional criteria such as whether the second resource has resolved the most issues in the second category. The processor can also take into account availability of the second resource, such as how many outstanding issues the second resource has to fix, and the relative priority of the outstanding issues and the current issue. In step 1360, upon determining the second resource, the processor can assign the issue to the second resource capable of fixing the issue.

The processor can track performance of multiple regions associated with the wireless telecommunication network, and can make resource allocation decisions based on the tracking. Resource allocation decisions can include reassigning issues to resources capable of fixing them or making hiring suggestions. The processor can obtain multiple regions associated with the wireless telecommunication network. For each region among the multiple regions, the processor can calculate a network assessment score based on the multiple priorities associated with all issues occurring within the region. For example, to calculate the network assessment score, the processor can obtain a total number of UEs associated with each region. The processor can obtain the multiple priorities associated with all issues occurring within each region. The processor can add the multiple priorities associated with all issues occurring within each region to obtain a total priority. The processor can calculate the network assessment score according to formula (1), where the network assessment score is proportional to a difference between the total number of UEs associated with each region and the total priority, and wherein the network assessment score is inversely proportional to the total number of UEs associated with each region. Based on the network assessment score, the processor can create a list indicating a performance of the wireless telecommunication network in the multiple regions.

The processor can make hiring suggestions based on the tracking. The processor can obtain multiple unresolved issues associated with the wireless telecommunication network. The processor can obtain multiple categories associated with the multiple unresolved issues, where a category among the multiple categories corresponds to an unresolved issue among the multiple unresolved issues, and where the category among the multiple categories indicates a skill needed to resolve the corresponding unresolved issue. The processor can rank the multiple categories based on a number of corresponding unresolved issues to obtain a ranking. Based on the ranking, the processor can make a hiring suggestion indicating a needed skill. For example, if ranking is above a predetermined threshold, the processor can suggest hiring a resource having the needed skill.

The processor also can record notes from work previously done, and keep a history of actions and issues opened and closed in the past. The processor can store actions performed while resolving the issue to obtain a history of actions associated with the issue. The processor can detect a second issue similar to the issue. The processor can present the history of actions as the guidance indicating how to address the issue. A similar issue can be an issue that has the same type. To provide guidance on how to resolve the issue, the processor can find issues having the same type because the two issues are more likely to be similar than two issues that have the same category, but different types.

The processor can also detect new issues that have been automatically opened, cleared and fixed. To do that, the processor can detect a second issue that has been automatically resolved, where the second issue is similar to the issue, as explained this application. The processor can obtain a resolution associated with the second issue. The processor can create a history of actions associated with the issue, including the actions' resolution associated with the second issue. The processor can present the history of actions as the guidance indicating how to address the issue.

The processor can also provide management tools to view network assessment score, progress tracking, breakdown of performance by engineer, as well as network analytics insights. The processor can obtain a total number of UEs impacted by the issue in a particular area. The processor can create a visualization of the total number of UEs impacted by the issue in the particular area. Finally, the processor can present the visualization, as shown in FIGS. 10-12.

The processor can track progress associated with the resource capable of fixing the issue in resolving the issue. The processor can create a visualization of the progress associated with the resource capable of fixing the issue. The processor can present the visualization.

The processor can obtain data associated with performance of multiple resources capable of fixing the issue, including the resource capable of fixing the issue. The processor can create a breakdown of performance of the multiple resources capable of fixing the issue. The processor can create a visualization of the breakdown of the performance of the multiple resources capable of fixing the issue. The processor can present the visualization.

Figure 14:
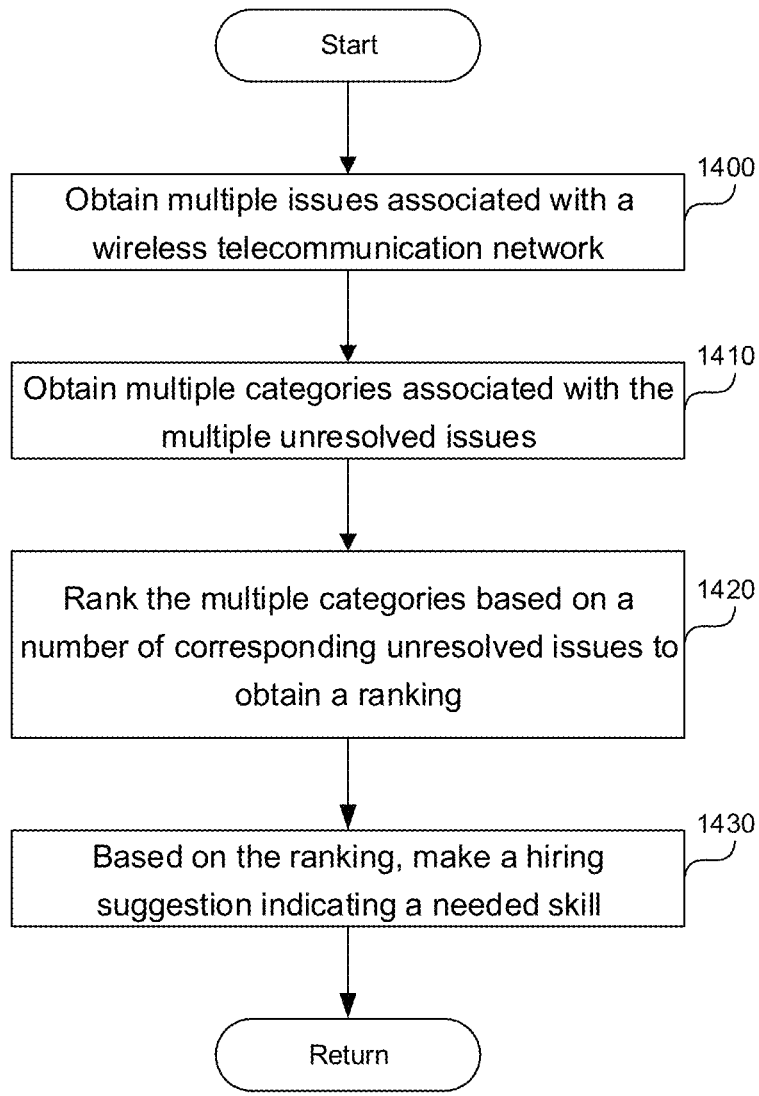
FIG. 14 is a flowchart of a method to make a resource allocation suggestion based on tracking issues in a wireless telecommunication network.

FIG. 14 is a flowchart of a method to make a resource allocation suggestion based on tracking issues in a wireless telecommunication network. Resource allocation suggestion can include a hiring suggestion, or a reassignment suggestion such as reassigning an issue to a different engineer or reassigning an engineer to a different geographical region.

In step 1400, a hardware or software processor executing instructions described in this application can obtain multiple unresolved issues associated with the wireless telecommunication network, where an issue among the multiple unresolved issues impacts a UE associated with the wireless telecommunication network. In step 1410, the processor can obtain multiple categories associated with the multiple unresolved issues, where the multiple categories include types 302, 312, 322 in FIGS. 3A-3B. A category among the multiple categories corresponds to an unresolved issue among the multiple unresolved issues. The category also indicates a skill needed to resolve the corresponding unresolved issue.

In step 1420, the processor can rank the multiple categories based on a number of corresponding unresolved issues to obtain a ranking. Based on the ranking, the processor can make a hiring suggestion indicating a needed skill.

In step 1430, the processor can use ranking based on the network assessment score to make resource reallocation suggestions, such as hiring suggestions or reassignment suggestions. The processor can obtain the multiple categories associated with the multiple unresolved issues of a worst performing region rank based on the network assessment score. The processor can rank the multiple categories based on the number of corresponding unresolved issues to obtain the ranking. Based on the ranking, the processor can make the resource reallocation suggestions such as hiring suggestions indicating the needed skill. The processor can perform additional steps as described in this application.

Computer System

Figure 15:
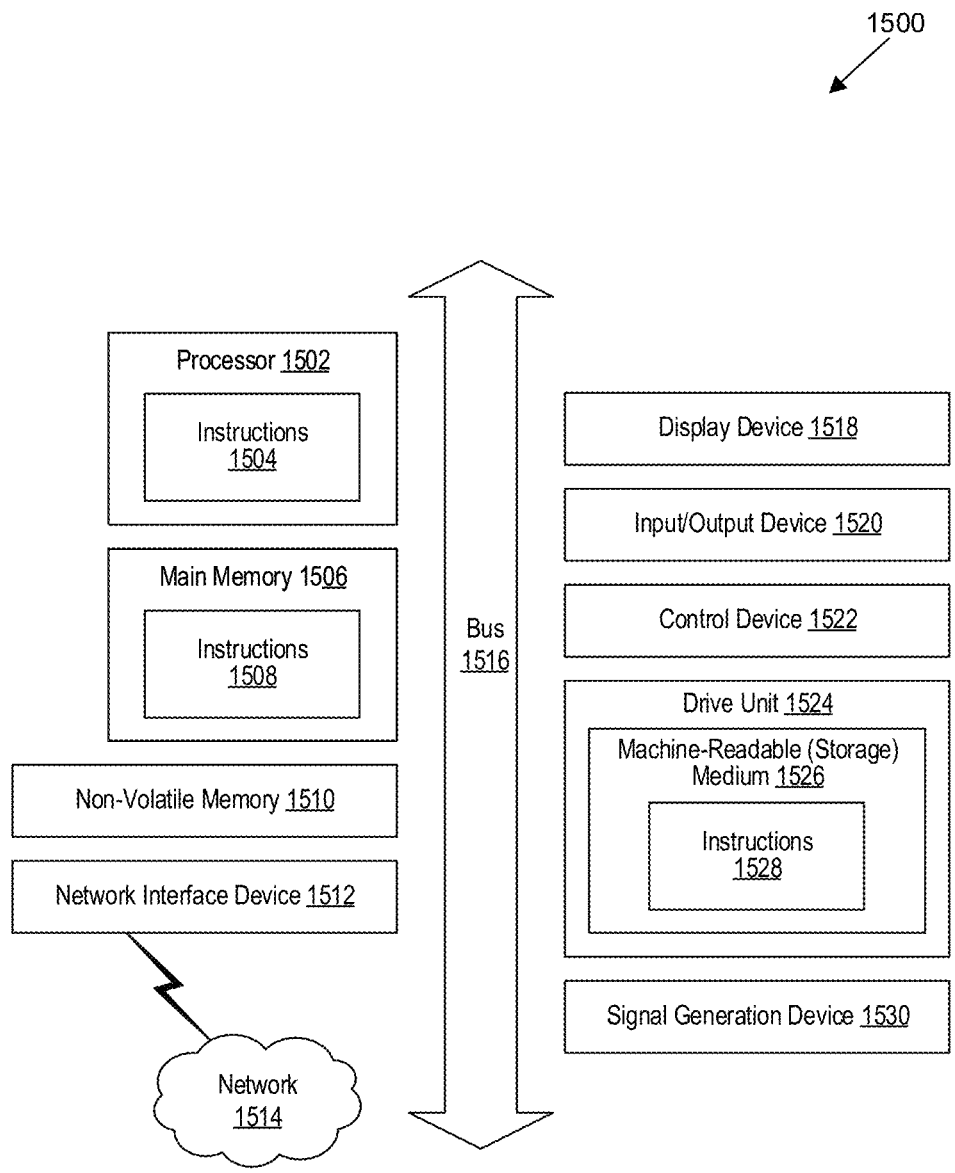
FIG. 15 is a block diagram that illustrates an example of a computer system in which at least some operations described herein can be implemented.

FIG. 15 is a block diagram that illustrates an example of a computer system 1500 in which at least some operations described herein can be implemented. As shown, the computer system 1500 can include: one or more processors 1502, main memory 1506, non-volatile memory 1510, a network interface device 1512, a video display device 1518, an input/output device 1520, a control device 1522 (e.g., keyboard and pointing device), a drive unit 1524 that includes a storage medium 1526, and a signal generation device 1530 that are communicatively connected to a bus 1516. The bus 1516 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the Figures and any other components described in this specification can be implemented.

The computer system 1500 can take any suitable physical form. For example, the computer system 1500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1500. In some implementations, the computer system 1500 can be an embedded computer system, a system-on-chip (SOC), a single-board computer system (SBC) or a distributed system such as a mesh of computer systems or include one or more cloud components in one or more networks. Where appropriate, one or more computer systems 1500 can perform operations in real-time, near real-time, or in batch mode.

The network interface device 1512 enables the computer system 1500 to mediate data in a network 1514 with an entity that is external to the computer system 1500 through any communication protocol supported by the computer system 1500 and the external entity. Examples of the network interface device 1512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1506, non-volatile memory 1510, machine-readable medium 1526) can be local, remote, or distributed. Although shown as a single medium, the machine-readable medium 1526 can include multiple media (e.g., a centralized/distributed database and/or associated caches and servers) that store one or more sets of instructions 1528. The machine-readable (storage) medium 1526 can include any medium that is capable of storing, encoding, or carrying a set of instructions for execution by the computer system 1500. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computer system 1500 to perform operations to execute elements involving the various aspects of the disclosure.

Remarks

The terms "example," "embodiment" and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. At least one non-transitory computer-readable storage medium, carrying instructions to assign resolution of an issue associated with a wireless telecommunication network to an engineer, which, when executed by at least one data processor of a system, cause the system to:
   obtain multiple regions associated with the wireless telecommunication network;
   for each region among the multiple regions calculate a network assessment score by:
      obtaining a total number of mobile devices associated with the each region;
      obtaining multiple priorities associated with a first multiplicity of issues occurring within the each region;
      combining the multiple priorities associated with the first multiplicity of issues occurring within the each region to obtain a total priority;
      calculating the network assessment score, wherein the network assessment score is proportional to a difference between the total number of mobile devices associated with the each region and the total priority,
wherein the network assessment score is inversely proportional to the total number of mobile devices associated with the each region, and
wherein the network assessment score indicates a percentage of mobile devices not affected by the first multiplicity of issues;
based on the network assessment score, create a list indicating a performance of the wireless telecommunication network in the multiple regions;
based on the list indicating the performance of the wireless telecommunication network in the multiple regions, obtain data regarding multiple issues associated with a region among the multiple regions,
wherein the issue among the multiple issues impacts a mobile device associated with the region;
obtain multiple categories associated with the multiple issues associated with the region;
determine a first category among the multiple categories and a number of issues associated with the first category and resolved by a first telecommunications engineer among multiple telecommunications engineers;
determine a second category associated with the issue among the multiple issues associated with the region;
determine that the first category and the second category match;
upon determining that the first category and the second category match, determine a second telecommunications engineer among the multiple telecommunications engineers who has resolved the most issues associated with the second category; and
assign the issue to the second telecommunications engineer.

2. The at least one non-transitory computer-readable storage medium of claim 1, comprising instructions to:
obtain multiple unresolved issues associated with the wireless telecommunication network,
wherein an unresolved issue among the multiple unresolved issues impacts the mobile device associated with the wireless telecommunication network;
obtain a second set of multiple categories associated with the multiple unresolved issues,
wherein a category among the second set of multiple categories corresponds to the unresolved issue among the multiple unresolved issues,
wherein the category among the second set of multiple categories indicates a skill needed to resolve the unresolved issue;
rank the second set of multiple categories based on a number of unresolved issues to obtain a ranking; and
based on the ranking, make a hiring suggestion indicating a needed skill.

3. The at least one non-transitory transit computer-readable storage medium of claim 1, the instruction comprising instructions to:
store multiple actions performed by the engineer while resolving the issue;
create a history of actions associated with the issue including the multiple actions performed by the engineer;
detect a second issue similar to the issue; and
present the history of actions as a guidance indicating how to address the issue.

4. The at least one non-transitory computer-readable storage medium of claim 1, comprising instructions to:
obtain a total number of mobile devices impacted by the issue in a particular area;
create a visualization of the total number of mobile devices impacted by the issue in the particular area; and
present the visualization.

5. The at least one non-transitory computer-readable storage medium of claim 1, comprising instructions to:
track progress associated with the engineer in resolving the issue;
create a visualization of the progress associated with the engineer; and
present the visualization.

6. The at least one non-transitory computer-readable storage medium of claim 1, comprising instructions to:
obtain data associated with performance of multiple engineers including the engineer;
create a breakdown of performance of the multiple engineers;
create a visualization of the breakdown of the performance of the multiple engineers; and
present the visualization.

7. A method to assign resolution of an issue associated with a wireless telecommunication network to a resource comprising:
obtain multiple regions associated with the wireless telecommunication network;
for each region among the multiple regions calculating a network assessment score by:
obtaining a total number of user equipments (UEs) associated with the each region;
obtaining multiple priorities associated with first multiplicity of issues occurring within the each region;
combining the multiple priorities associated with the first multiplicity of issues occurring within the each region to obtain a total priority;
calculating the network assessment score,
wherein the network assessment score is proportional to a difference between the total number of UEs associated with the each region and the total priority,
wherein the network assessment score is inversely proportional to the total number of UEs associated with the each region, and
wherein the network assessment score indicates a percentage of UEs not affected by the first multiplicity of issues;
based on the network assessment score, create a list indicating a performance of the wireless telecommunication network in the multiple regions;
based on the list indicating the performance of the wireless telecommunication network in the multiple regions, obtain data regarding multiple issues associated with a region among the multiple regions,
wherein the issue among the multiple issues impacts a UE associated with the region among the multiple regions;
determining a first category among the multiple categories and a number of issues associated with the first category and resolved by the resource capable of fixing the issue among multiple resources capable of fixing the issue,
wherein the first category among the multiple categories indicates a skill needed to resolve the issue among the multiple issues associated with the region;

determining a second category associated with the issue;
determining that the first category and the second category match;
upon determining that the first category and the second category match, determining a second resource capable of fixing the issue among the multiple resources capable of fixing the issue; and
assigning the issue to the second resource capable of fixing the issue.

8. The method of claim 7, comprising:
obtaining multiple unresolved issues associated with the wireless telecommunication network,
  wherein an unresolved issue among the multiple unresolved issues impacts the UE associated with the wireless telecommunication network;
obtaining a second set of multiple categories associated with the multiple unresolved issues,
  wherein a category among the second set of multiple categories corresponds to the unresolved issue among the multiple unresolved issues,
  wherein the category among the second set of multiple categories indicates the skill needed to resolve the unresolved issue;
ranking the second set of multiple categories based on a number of unresolved issues to obtain a ranking; and
based on the ranking, making a hiring suggestion indicating a needed skill.

9. The method of claim 7, comprising:
storing actions performed while resolving the issue to obtain a history of actions associated with the issue;
detecting a second issue similar to the issue; and
presenting the history of actions as a guidance indicating how to address the issue.

10. The method of claim 7, comprising:
obtaining a total number of UEs impacted by the issue in a particular area;
creating a visualization of the total number of UEs impacted by the issue in the particular area; and
presenting the visualization.

11. The method of claim 7, comprising:
tracking progress associated with the resource capable of fixing the issue;
creating a visualization of the progress associated with the resource capable of fixing the issue; and
presenting the visualization.

12. The method of claim 7, comprising:
obtaining data associated with performance of multiple resources capable of fixing the issue;
creating a breakdown of performance of the multiple resources capable of fixing the issue;
creating a visualization of the breakdown of the performance of the multiple resources capable of fixing the issue; and
presenting the visualization.

13. A system to assist in making resource allocation suggestions, the system comprising:
at least one hardware processor; and
at least one non-transitory memory storing instructions, which, when executed by the at least one hardware processor, cause the system to:
  obtain multiple regions associated with the wireless telecommunication network;
  for each region among the multiple regions calculate a network assessment score by:
    obtaining a total number of user equipments (UEs) associated with the each region;
    obtaining multiple priorities associated with first multiplicity of issues occurring within the each region;
    combining the multiple priorities associated with the first multiplicity of issues occurring within the each region to obtain a total priority;
    calculating the network assessment score,
      wherein the network assessment score is proportional to a difference between the total number of UEs associated with the each region and the total priority,
      wherein the network assessment score is inversely proportional to the total number of UEs associated with the each region, and
      wherein the network assessment score indicates a percentage of UEs not affected by the first multiplicity of issues;
  based on the network assessment score, create a list indicating a performance of the wireless telecommunication network in the multiple regions;
  obtain data regarding multiple unresolved issues associated with a worst performing region among the multiple regions,
    wherein the issue among the multiple unresolved issues impacts a UE associated with the worst performing region;
  obtain multiple categories associated with the multiple unresolved issues of the worst performing region;
    wherein a category among the multiple categories corresponds to an unresolved issue among the multiple unresolved issues,
    wherein the category among the multiple categories indicates a skill needed to resolve the unresolved issue;
  rank the multiple categories based on a number of unresolved issues to obtain a ranking; and
  based on the ranking, make a resource allocation suggestion addressing a needed skill.

14. The system of claim 13, comprising instructions to:
obtain data associated with performance of multiple resources capable of fixing the issue including a resource capable of fixing the issue;
create a breakdown of performance of the multiple resources capable of fixing the issue;
create a visualization of the breakdown of the performance of the multiple resources capable of fixing the issue; and
present the visualization.

* * * * *